Figure 1:
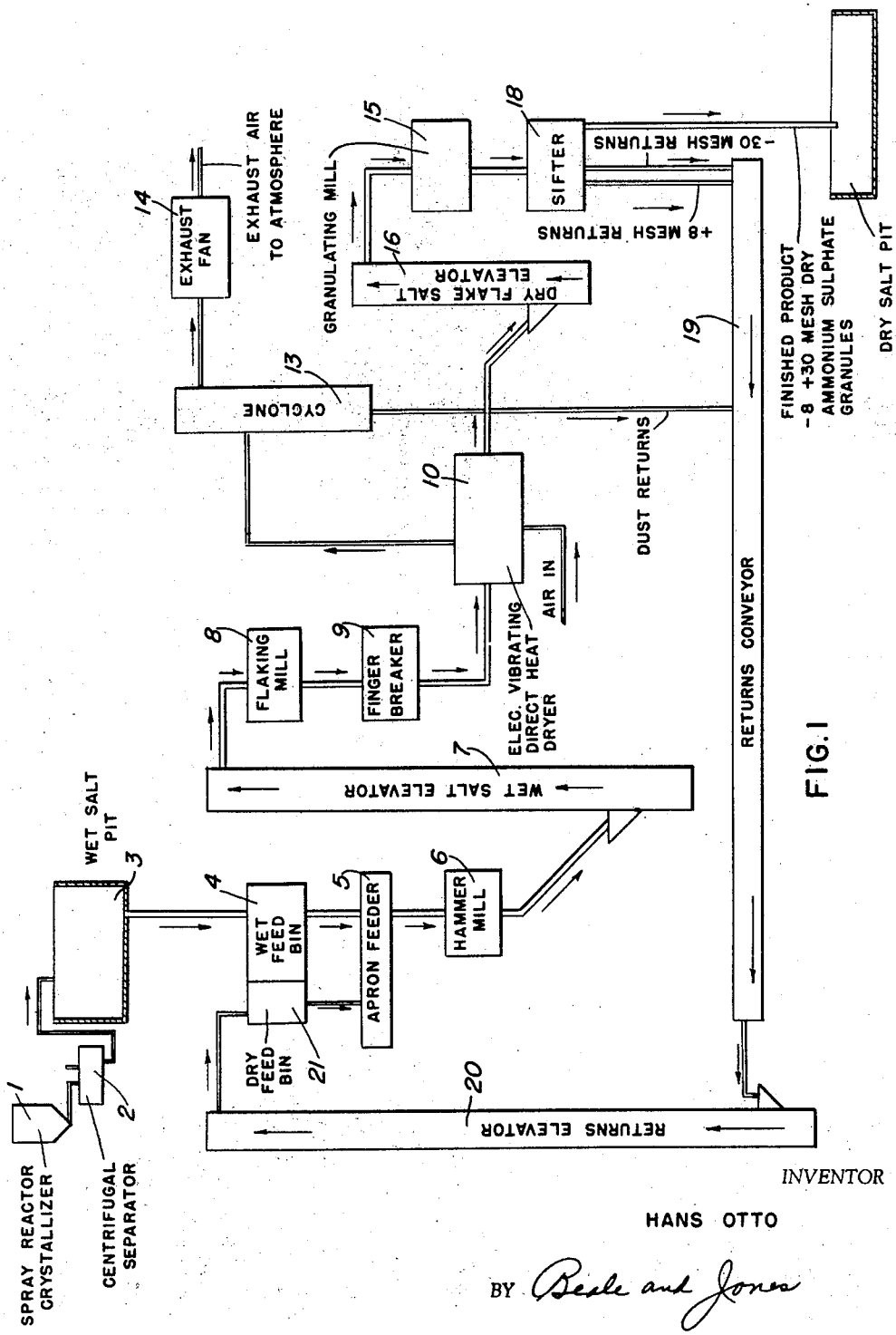

United States Patent Office 2,917,381
Patented Dec. 15, 1959

2,917,381

PROCESS OF FLAKING AND GRANULATING AMMONIUM SULPHATE

Hans Otto, Manhasset, N.Y., assignor to Otto Construction Corporation, New York County, N.Y.

Application July 6, 1956, Serial No. 596,182

3 Claims. (Cl. 71—64)

This invention relates to a process for the preparation of ammonium sulphate in granular form utilizing acicular or needle-like crystals prepared for example from sulphuric acid and the ammonia content of coke oven gas by a process such as that disclosed in United States Patent 2,688,533, to C. Otto. By such a process a neutral salt may be obtained as contrasted with other methods.

Workers in the art have long sought to obtain ammonium sulphate in such form that it can be used as a fertilizer which can be applied to the soil in agricultural drilling machinery. Commercially available ammonium sulphate is often of such particle size and form that it cannot be applied to the soil with standard farm machinery. The numerous attempts to accomplish the objective of improving the physical form of ammonium sulphate for agricultural use have usually involved methods of increasing the crystal size. One such method consisted of utilizing a spray saturator such as that disclosed in the prior patent noted above, to increase the circulation and recirculation of the "liquor," comprising excess sulphuric acid and ammonium sulphate, the latter in saturated solution and as crystals of various sizes, to an amount of about 100,000 gallons per ton of salt produced. In the spray saturator, ammonia-containing gas is passed through a spray of this saturated solution comprising crystals and free acid. Part of the resulting crystal slurry is withdrawn, and the remainder is recirculated through the gas and liquid contacting space wherein the spraying takes place. The "circulation rate" is the number of gallons of liquor passed through the gas and liquid contacting space for each ton of salt produced. By increasing the circulation rate, the average size of the crystals produced may be increased. Where the circulation rate is between 20,000 and 60,000 gallons of liquor per ton of salt produced, about 60% of the crystals will pass through a 35 mesh screen, United States sieve series. Another method proposed to obtain coarse crystals is to add materials to a solution of $(NH_4)_2SO_4$ or to a slurry of the crystals thereof which alter the characteristics of the crystals. In some cases, it has been found that the added chemical primarily functions to change the ratio of width to length of the crystals. This type of process is illustrated by the United States Patent to Runscheidt et al., 2,430,068. Another attempt to solve this problem consisted of granulating moist crystalline ammonium sulphate by means of flaking rolls and a tumbling process, with or without an adhesive liquid to obtain a product of desired particle size which may be dried. Such a process is disclosed in United States Patent Number 2,167,432, granted to Cox et al. Still another type of process for obtaining materials such as ammonium sulphate in the form of relatively large granules is disclosed in United States Patent 2,631,084, to Robinson. The process of this patent involves the preparation of unusually small crystals, mixing a slurry of these small crystals with dried crystalline material, and tumbling the mixture to obtain granules. For this type of process, the crystals must be of uniform size for best results, and such uniformity is difficult to attain without resorting to mechanical processes of crystal size classification.

This invention is an improvement over all prior known methods of controlling the particle size of ammonium sulphate. The invention is based upon the discovery that an improved granular product may be obtained by carefully controlling a flaking roll type of granulating process. The factors which must be observed and controlled within certain critical limits to obtain the results sought include (1) employing an ammonium sulphate crystal preferably of acicular form; (2) maintaining the moisture content of the feed to the flaking apparatus within specific limits; and (3) employing a specific order of manipulative steps including curing and partially drying the ammonium sulphate crystals prior to granulating.

It is an object of this invention to provide a process of agglomerating ammonium sulphate crystals by compressing moist crystals to form thin sheets or flakes, curing said flakes, and then comminuting the cured flakes to form granules, said process being an improvement over prior processes concerned with the same problem.

It is a further object of this invention to attain the preceding object by maintaining the moisture content of said moist crystals within critical limits until after the flakes are formed.

Still another object of this invention is to provide an ammonium sulphate fertilizer in a crystalline, granular form which is easily applied to the soil with standard farm equipment.

The foregoing objects are attained by the process of this invention, which includes the steps of crystallizing ammonium sulphate in spray saturators identified in this art as "spray reactor crystallizers," utilizing a circulation rate of, preferably, from about 20,000 to about 60,000 gallons per ton of salt made, removing liquor from the crystals to obtain a moisture content of 0.6 to 3%, feeding the acicular crystals thus obtained to flaking or compacting rolls, curing and partially drying the flakes, grinding or granulating the flakes, and classifying the resulting granules according to size. No binder, except the moisture or liquor adhering to the crystals, is required.

Figure 2:
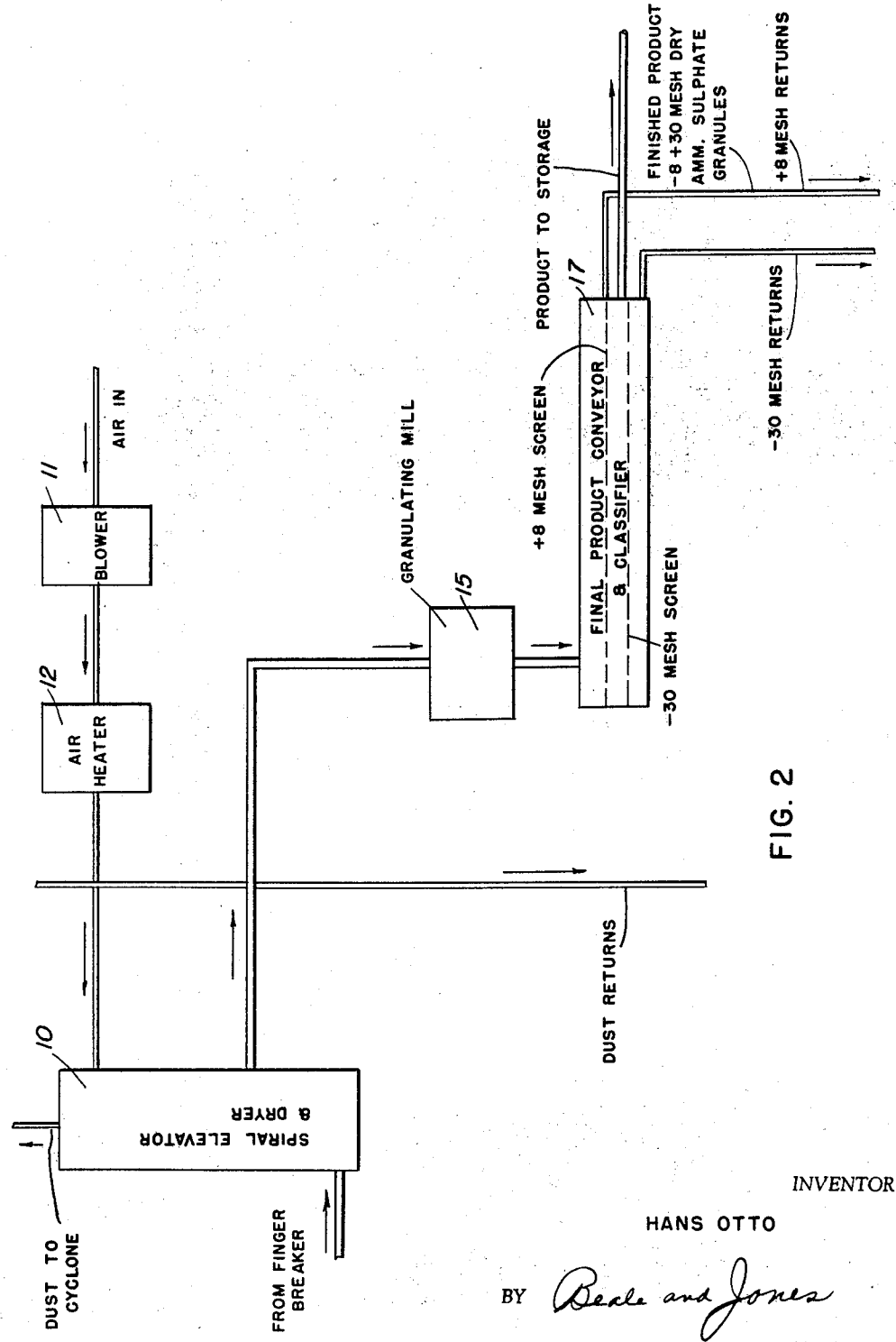

The basic steps of, and apparatus for, carrying out the process comprising this invention are disclosed in schematic drawings wherein Fig. 1 shows the preferred embodiment, and Fig. 2 shows a modified arrangement, which, except for the drying and classifying devices, is similar to that of Fig. 1.

Referring to Fig. 1, the liquor is circulated in a spray saturator 1 at a rate, preferably, of between 20,000 and 60,000 gallons per ton of salt produced. The circulation rate of the liquor in the spray saturator should be kept within limits such that crystals of small size are produced, and which are amenable to handling in apparatus such as a centrifugal separator. The rate of circulation may range from as low as 3,000 gallons per ton of salt made to as high as 100,000 gallons per ton of salt. Acicular crystals prepared in vacuum evaporators may also be used, as may crystals having other shapes, such as blocky crystals. The length of the crystals produced may range from as low as about 10 microns to about 2 millimeters. The slurry of acicular crystals is fed from the saturator or crystallizer to a centrifugal separator 2 of the perforated basket type. Instead of a perforated basket type of centrifugal separator such as a Sharples or suspended basket type, it is obvious that a centrifugal bowl separator such as a Baker-Perkins separator, or a filter such as a Swenson or similar vacuum drum filter, may be utilized. The crystals are then fed to a wet salt pit 3, from which a grab bucket (not shown) or other conventional transfer or conveyor means may be used to transfer the wet salt to a surge or feed bin 4. At this point, through control of the liquid separation step and the storage conditions, the moisture content of the ammonium sulphate crystals is within the narrow range of 0.6% to 3% by weight, preferably from about 1.5% to about 2% by weight. If the moisture content, by weight, is either above 3% or below 0.6%, the material will not form satisfactory flakes, and this control of the moisture content of the crystals is, therefore, an important feature of this invention. From the wet feed bin the ammonium sulphate is conveyed by an apron feeder 5 into a hammer mill 6 where lumps in the ammonium sulphate crystals are broken and tramp iron is removed.

The hammer mill discharges the sulphate onto a bucket elevator 7 which feeds a flaking mill 8 where the ammonium sulphate crystals are compressed into flakes. Where the hammer mill is located appropriately the elevator may be omitted, as in Fig. 2. A suitable flaking mill is made by Allis-Chalmers. The rolls may be chilled alloy iron having a scleroscope hardness average of 74 points with forged alloy steel shafts mounted in sleeve type bearings. The mill includes scrapers, a feed hopper and appropriate drive means. Another suitable compacting and flaking device is made by the Hermann Bauermeister Co., Hamburg, Germany. From the flaking mill the flakes are fed into a finger roll breaker 9 where the flakes are prebroken into a size suitable for conveying and drying in a dryer 10. The flakes must have a moisture content of from 0.6% to 3% for the reasons that the flakes are relatively easy to form and can stand limited handling. However, it is essential that the flakes be cured and partially dried before being subjected to relatively rough handling, since the flakes are still quite fragile at this stage.

The ammonium sulphate flakes must be cured before they are granulated, in order to avoid excessive fines. The precise effect on the microstructure of the flakes produced by curing is not fully known. One possibility is that saturated liquor is slowly drawn to the points of contact of the individual crystals, whereupon moisture evaporates and the crystals are "grown" together. The partial drying thus might be merely incidental. This curing may be done by any of a number of methods. One suitable apparatus, as shown in Fig. 2, is a spiral elevator and dryer 10 where the flakes are cured and dried by direct contact with pre-heated air. A blower 11 and an air heater 12 are required for this type of dryer. Another suitable apparatus is an electric or mechanical vibrating direct heat dryer 10, as shown in Fig. 1. In this apparatus a vibrating surface conveys the flakes while hot air passes through it. Any other appropriate curing method may be used which will make the least fines, such as simply spreading the flakes out on a floor, or using radiant heat such as infra-red heat. In the dryer the moisture content of the flakes is reduced to harden the flakes. Where air is circulated through the drying apparatus, the air, containing dust, is fed to a conventional cyclone separator 13. An exhaust fan 14 withdraws the air from which the dust has been removed in the cyclone. The hot air discharge from the cyclone may pass through a bag filter or a wet scrubber (not shown) to remove the last traces of carried-over salt fines. The separated dust is returned to a point ahead of the flaking mill. In the case of the vibrating direct heat dryer heated air is circulated through the curing and drying apparatus. An air heater is not shown in Fig. 1, however.

From the curing stage the pre-broken and cured flakes are fed to a granulating or crushing mill 15 by means of an elevator 16. The granulating apparatus may also be made by Allis-Chalmers, and may comprise one or more pairs of granulating rollers in each of one or more granulating mills. Excellent results may be obtained by the use of corrugated circle chilled rollers. The particle size range of the granules is determined in part by control of the granulator.

From the granulating mill, the flakes are fed to a classifying apparatus where the undersize and oversize particles are removed from the product. Any suitable type of classifier may be used. One satisfactory type is a horizontally vibrating classifier 17, as shown diagrammatically in Fig. 2, having two sets of screens, one to remove the oversize particles and the other to allow the fines to pass through and be separated from the final product. The vibration of the screen conveys the product therethrough. Another type which may be used is a circle sifter, which may be used as the sifter 18 of Fig. 1. The particles smaller than about 30 mesh and larger than about 8 mesh, outside the size range appropriate for use in existing agricultural equipment, are returned by a conveying means 19 and a bucket elevator 20 to a dry feed bin 21 located just ahead of the apron feeder. The oversize particles may be returned to a point just ahead of the granulator, by means not shown, rather than to the dry feed bin. The fines and dust separated in the cyclone connected with the dryer may also be returned to this dry feed bin by conveyors 19 and 20. The dry material is fed to the apron feeder along with the material from the wet feed bin, in such proportions that the moisture content of the crystalline material fed to the flaking mill is within the critical range of 0.6% to 3%. If necessary, moisture may be added, although it may be preferred to simply remove less mother liquor in the dewatering step. The finished product is conveyed to an appropriate storage means, such as a dry salt pit 21. The above description of suitable apparatus is given by way of example only, and appropriate equivalent devices well known in the art may be utilized. For example, the conveyors may be of any appropriate type such as a spiral conveyor, a Redler conveyor, bucket elevators, and gravity chutes.

The following examples illustrate appropriate procedures to follow in carrying out the invention:

*Example 1*

A slurry of needle-shaped crystals, prepared in the spray saturator or crystallizer, wherein about 50,000 gallons of liquor per ton of salt produced is circulated through the saturator, is centrifuged to reduce the moisture content of the wet ammonium sulphate feed to 2% by weight. The dewatered crystals are then deposited in the wet feed bin. At this point, over 50% of the ammonium sulphate crystals are of such size that they would pass through a 35 mesh screen. During the starting run no material is in the dry feed bin, and thus this moisture content of the wet salt need not be further controlled by coordinating the feed of dry return material and wet material, as must be done later. The wet salt is conveyed by the apron feeder at a rate of 8.3 tons per hour to the hammer mill where caked lumps up to 4 inches by 5 inches are crushed, and in which a metal catcher removes tramp iron. From the hammer mill the salt is fed to the above described flaking mill in which the rolls are set to produce flakes about 2.4 millimeters thick. The setting is changed for material having a substantially different moisture content. At this point the flakes are in the form of long narrow sheets which are too coarse to be efficiently handled in the dryer.

In order to reduce the flakes in size they are fed to a breaker of the finger type wherein the flakes are reduced to particles having a maximum dimension of about one inch.

From the finger breaker the flakes are fed by means of a conveyor into the spirals of a spiral elevator and dryer, where the flakes are cured and dried by direct contact with preheated air. To reiterate, it is essential that the flakes be cured before passing to the granulating rolls in order to prevent excessive fines, and to yield a uniform product. The moisture content of the flakes is reduced by the dryer to 0.1% by weight. Salt fines are separated from the air passing through the dryer by means of a cyclone, and returned to a point ahead of the flaking mill, namely, the dry feed bin. The cured and dried flakes are discharged from the curing spirals and fed to two Allis-Chalmers granulating mills, each having two vertically stacked pairs of corrugated circle chilled rolls, wherein the flakes are granulated or crushed. The granules are then classified on wire mesh screens so that the product is between about 8 mesh and 30 mesh. Material finer than 30 mesh is returned to the dry feed bin, and material coarser than 8 mesh is returned to the granulator feed hopper. The product of the granulator shows the following distribution of particle sizes, U.S. standard screen mesh:

|   | Percent |
|---|---|
| On eight mesh | 0 |
| Through 8 and on 20 mesh | 30 to 65 |
| Through 20 and on 35 mesh | 30 to 65 |
| Through 35 mesh | 5 |

*Example 2*

Wet ammonium sulphate crystals, prepared and centrifuged as described in Example 1, are fed to the granulating plant at the rate of 8.3 tons per hour. In this case the moisture content of the wet ammonium sulphate is 1.5% by weight. The wet sulphate is fed from the wet feed bin to the hammer mill by means of the apron feeder. From the hammer mill the salt is fed to the flaking mill where flakes of the dimensions described in Example 1 are obtained. The flakes produced in the flaking mill are chuted into a finger roll breaker where they are broken to a size having maximum dimensions of about 1 inch by 1 inch, and a thickness, as determined by the setting of the flaking mill rolls, in turn determined by the moisture content of the wet salt, of about 2.4 millimeters. The flakes are then fed to a direct heat dryer of the vibrating type by means of a spreader feeder, wherein they are cured and dried to a moisture content of about 0.1%. Air is circulated through the dryer, and entrained salt fines are separated in a cyclone. The cured and dried flakes are discharged into a bucket elevator which feeds the flakes into the granulating mills. The crushing or granulating mills are the same as used in Example 1. The flakes are discharged from the granulators into a circle sifter where the product is classified. The U.S. standard screen analysis of the dry ammonium sulphate granules produced is as follows:

|   | Percent |
|---|---|
| On eight mesh | 0 |
| Through 8 and on 20 mesh | 30 to 65 |
| Through 20 and on 35 mesh | 30 to 65 |
| Through 35 mesh | 5 |

The undersize granules are discharged from the sifter and returned, with dust from the cyclone, by means of a conveyor and bucket elevator to the apron feeding system. The oversize salt is returned to the granulator. The acceptable granular product is discharged onto a conveyor for removal to a point clear of the sifter.

The products obtained in the runs of Examples 1 and 2 are free-flowing, relatively uniform in particle size, practically free of dust, stable on storage, and are eminently suitable as a fertilizer which may be applied to the soil by means of agricultural drilling machinery, especially where used for side dressing. In Example 2, above, the process disclosed therein may be carried out by substituting diammonium phosphate crystals for the ammonium sulphate crystals. The range of moisture content of the diammonium phosphate crystals is maintained below 0.5% by weight prior to flaking, since this salt will flake when dry.

The fact that acicular crystals of ammonium sulphate may be converted to a stable form as particles of relatively large size is an important aspect of this invention. For example, in United States Patent 2,631,084, to Robinson, the disadvantages of ammonium sulphate crystals of this shape are discussed. When dried, the individual crystals tend to cement together, causing an unusually high percentage of oversized material which must be reprocessed after the product is screened. During storage, the individual crystals tend to adhere to one another to such an extent that the free-flowing properties of the initial product are lost, and the ordinary material has an extremely high angle of repose. The product of this invention does not have these disadvantages, even though acicular crystals are used. The fact that this invention yields a product having a limited distribution of granule sizes contributes to the free-flowing properties of the product; for example, bridging in hoppers is minimized.

The use of high pressure flaking rolls provides compact, dense products, which are slowly soluble in the soil because of the physical form of the granules. This slow solubility because of the increased particle size and density enhances the value of the product in agriculture as a fertilizer.

The illustrative embodiments described above are given by way of example only, and obvious modifications will be apparent to those skilled in the art. Such modifications are intended to be included in the appended claims.

I claim:

1. A process of preparing uniform, dense granules of ammonium sulphate from crystals thereof, comprising the steps of adjusting the moisture content of a mass of ammonium sulphate crystals having a maximum crystal dimension of about 2 millimeters, to a value of between about 0.6 and 3% water by weight, disintegrating large lumps of crystals in the mass preparatory to forming flakes therefrom, flaking the moist mass having said adjusted moisture content by feeding the mass between rotating high pressure flaking rolls thereby compacting the mass of crystals and producing large flakes, reducing the moist flakes in size to dimensions such that the material may be efficiently dried and cured while in the form of flakes, curing and drying the flakes to a moisture content of approximately 0.1%, thereby hardening and preparing the flakes for the preparation of granules therefrom, forming granules by crushing the cured flakes, classifying the granular material according to particle size, and recovering dense granules of ammonium sulphate having a particle size of between about 8 and 30 mesh, U.S. sieve series, as the final product.

2. The process of claim 1 in which acicular crystals of ammonium sulphate are utilized.

3. A process of preparing uniform, dense granules of ammonium sulphate, comprising the steps of mixing crystals of ammonium sulphate, said crystals having a maximum dimension no larger than about 2 millimeters, with granular particles of ammonium sulphate smaller than about 30 mesh, said granules being recycled from the classifying step described below, adjusting the moisture content of the mixture to a value of between about 0.6 and 3% by weight, disintegrating large lumps in the mixture preparatory to forming flakes therefrom, flaking the mixture of crystals and recycled granules of said adjusted moisture content by feeding the mixture between rotating high pressure flaking rolls, thereby compacting the mixture and producing large flakes, reducing the moist flakes in size to dimensions such that the material may be efficiently dried and cured while in the form of flakes, curing and drying the flakes to a moisture content of approximately 0.1%, thereby hardening and preparing the flakes for granulating, forming granules by crushing the cured flakes, classifying the granules to obtain a fraction of between about 8 mesh and about 30 mesh as the final product and a fraction smaller than about 30 mesh, all mesh sizes being U.S. sieve series, and recycling the granules smaller than about 30 mesh to said mixing step.

References Cited in the file of this patent

UNITED STATES PATENTS

| | | |
|---|---|---|
| 1,137,181 | Berg | Apr. 27, 1915 |
| 2,461,089 | Smidth | Feb. 8, 1949 |
| 2,463,680 | Corrigan | Mar. 8, 1949 |
| 2,631,084 | Robinson | Mar. 10, 1953 |
| 2,689,398 | Gaut et al. | Sept. 21, 1954 |